(12) United States Patent
Bona et al.

(10) Patent No.: US 6,438,292 B1
(45) Date of Patent: Aug. 20, 2002

(54) BROADENING OF ARRAYED WAVEGUIDE GRATING PASSBAND RESPONSE

(75) Inventors: Gian Luca Bona, Hedingen; Folkert Horst, Kilchberg; Bert Jan Offrein, Langnau am Albis, all of (CH)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 09/654,448

(22) Filed: Sep. 1, 2000

(30) Foreign Application Priority Data

Sep. 2, 1999 (EP) .............................. 99810786

(51) Int. Cl.[7] .................................................. G02B 6/34
(52) U.S. Cl. .......................................... 385/37; 385/28
(58) Field of Search .............................. 385/28, 29, 24, 385/37, 14

(56) References Cited

U.S. PATENT DOCUMENTS 5,706,377 A * 1/1998 Li ................................ 385/37
6,195,482 B1 * 2/2001 Dragone ....................... 385/28
6,289,147 B1 * 9/2001 Bulthuis et al. .............. 385/24

* cited by examiner

*Primary Examiner*—Hemang Sanghavi
*Assistant Examiner*—Scott A Knauss
(74) *Attorney, Agent, or Firm*—Douglas W. Cameron; Anne Vachon Dougherty

(57) ABSTRACT

The essential feature is the step of generating a controllable 'dynamic' intensity field profile with a controllable beating pattern in a multimode superposition of different modes, as e.g., a fundamental mode and a higher order mode as e.g., the TE0 mode and TE1 mode of an input wavelength entering the input site of an AWG apparatus, whereby said beating pattern is controlled in a fixed, or in variable, predetermined way, as e.g., with a fixed or a wavelength dependent power ratio and beating pattern, for improving the mode overlap in a receiver waveguide associated with an output site of said apparatus. With variable conditions, a lower number of converter units is required. In a 8:1 multiplexer, for example, there is needed just one converter unit at its output. A 1:8 demultiplexer can be obtained by solely reversing the AWG apparatus.

20 Claims, 9 Drawing Sheets

FIG.1
PRIOR ART
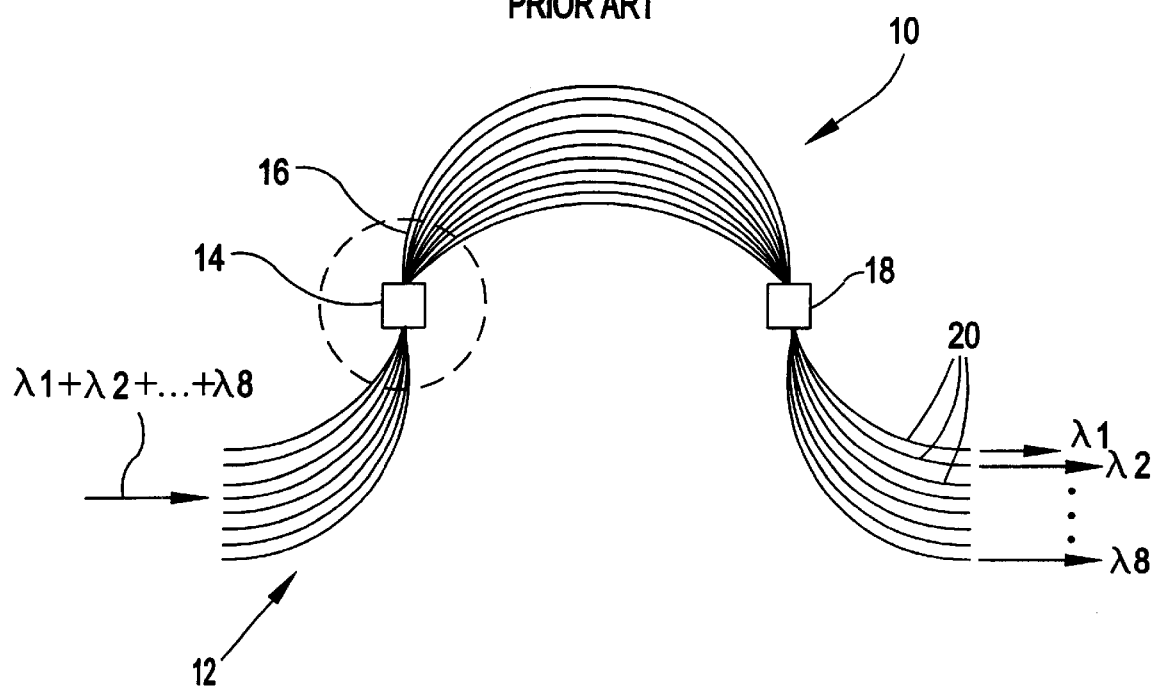
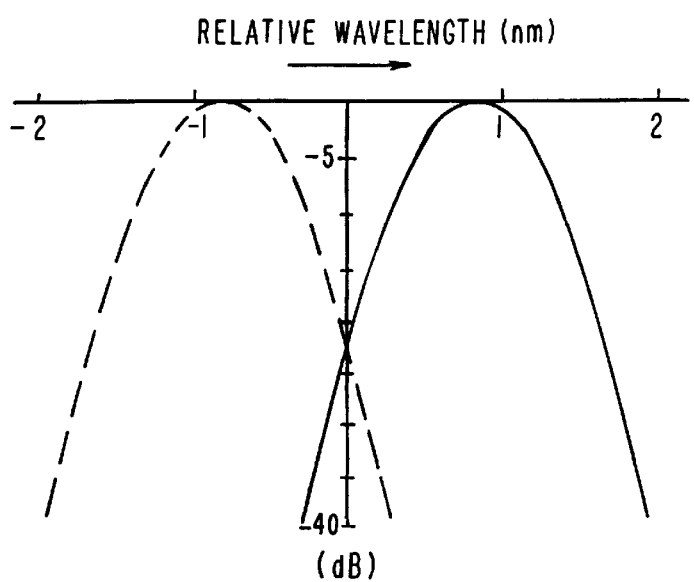
FIG. 2

FIG. 6
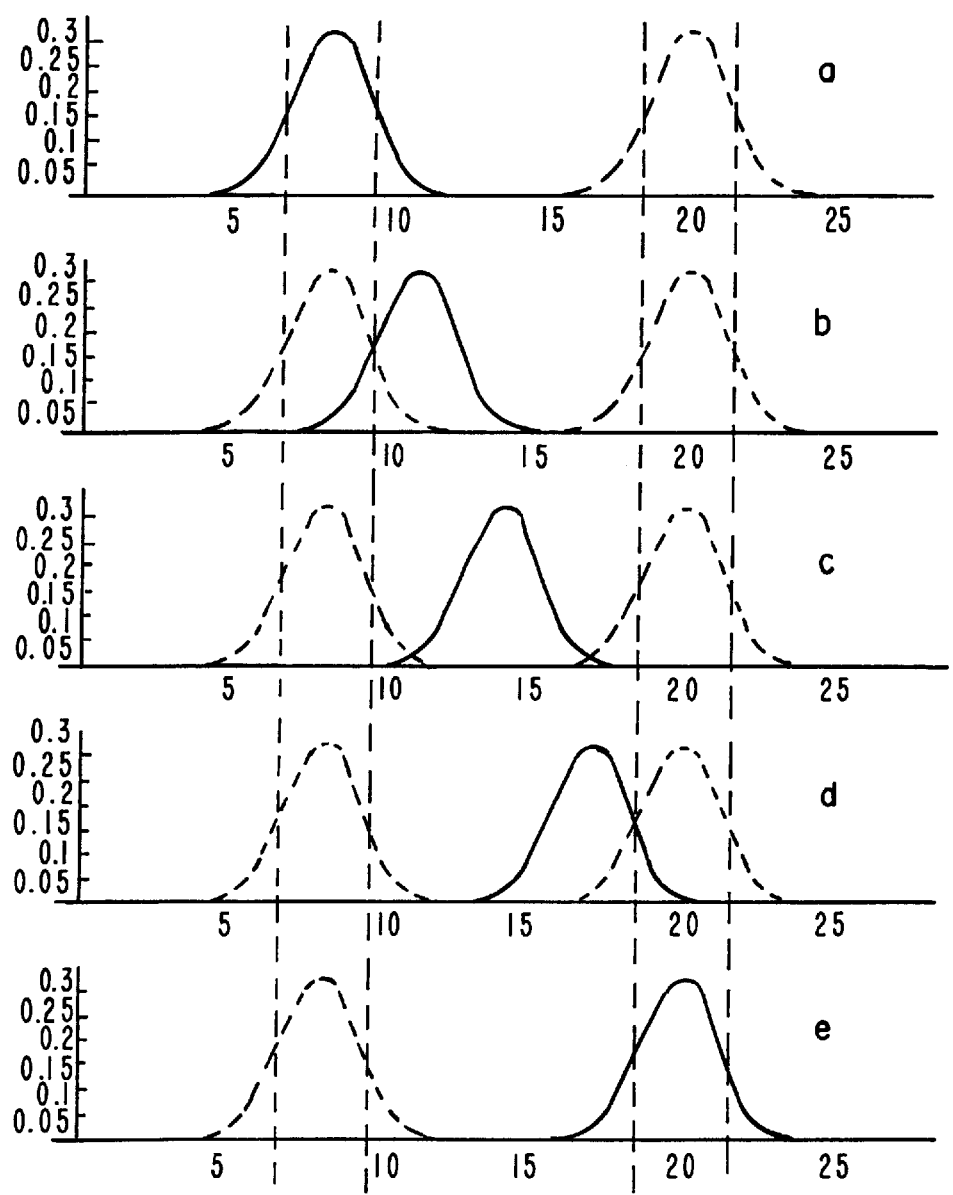
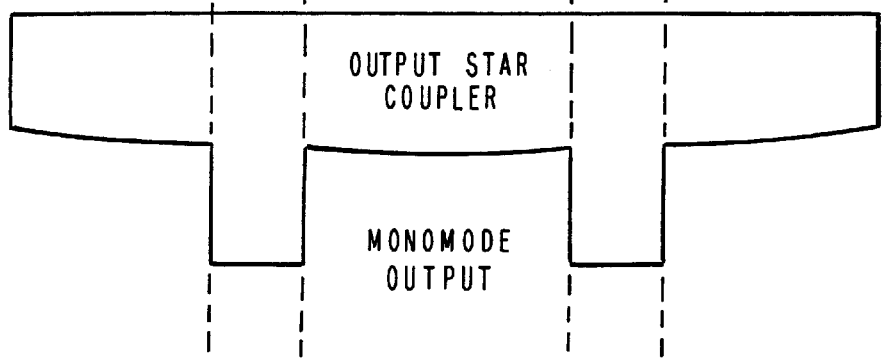

BROADENING OF ARRAYED WAVEGUIDE GRATING PASSBAND RESPONSE

FIELD OF THE INVENTION

The present invention relates to optical networks. In particular it relates to method and apparatuses for improving optical networking properties by broadening the passband response of network components comprising arrayed waveguide gratings.

BACKGROUND OF THE INVENTION

Loss reduction in optical networks is of major concern because it reduces the need for optical signal amplification. A flattened passband of any network component is a general aim of optical network traffic as it reduces the strict requirements on wavelength control and allows cascadability of components without affecting optical transmission properties. Therefore both low losses and flat passbands are important factors to reduce cost in optical networks.

In FIG. 1 an Arrayed Waveguide Grating, further referred to herein as AWG is drawn schematically. This component can be used to separate a set of wavelengths impinging on a single input waveguide port. Each wavelength is transferred to a separate output waveguide. Reversibly, the AWG can take a number of wavelengths entered at respective input ports and combine them all on one output port. The component can thus be used as a wavelength demultiplexer and as a multiplexer.

FIG. 2 shows an example of the calculated transfer function of an AWG as disclosed in 'Smit, M:K., van Dam,C., "PHASAR-Based WDM-Devices: Principles, Design and Applications", IEEE Journal of Selected Topics in Quantum Electronics, vol. 2, pp.236–250, 1996' from an input channel to two adjacent output channels with a wavelength separation of 1.6 nm. The shown transfer function is generally obtained for a prior art AWG, improved for a channel to channel crosstalk smaller than −40 dB. For this standard transfer function, the −1 dB bandwidth of a channel is approximately 30% of the channel spacing.

To reduce the sensitivity of a communications system for wavelength drifts either in transmitter lasers or in an AWG, it would be advantageous as a general aim of the present invention to increase the width of the −1 dB passband relative to the channel spacing, i.e., to flatten the transmission function.

For broadening said passbands in prior art, amongst others, multimode receiver waveguides at the output of the AWG are used. This method, however, only works when the AWG is used as demultiplexer, immediately followed by the detector diodes.

Therefore, an object of the present invention is to provide an improved method and apparatus for a broadening the passband of optical network components having one or more Arrayed Waveguide Gratings.

SUMMARY OF THE INVENTION

These objects of the invention are achieved by the features stated in enclosed independent claims. Further advantageous arrangements and embodiments of the invention are set forth in the respective subclaims.

According to a first aspect the present invention discloses a method for improving the passband of an optical network device -or apparatus- which includes an arrayed waveguide grating. The essential feature is the step of generating a controllable and thus somehow 'dynamic' intensity field profile with a controllable beating pattern in a multimode superposition of different modes—as e.g., a fundamental mode and a first mode, or higher mode, respectively or a superposition of higher modes only—of an input wavelength entering the input site of said apparatus, whereby said beating pattern is controlled in a fixed, predetermined way for improving the mode overlap in a receiver waveguide associated with an output side of said apparatus in order to achieve a wavelength-dependent coupling performance when coupling said multimode superposition into said receiver waveguide. For simplicity, throughout the following description it is referred to only exemplarily to the TE0 mode as the fundamental mode and to the TE1 mode as a higher order mode.

This is achieved for example in a multiplexer component by a symmetrical arrangement of multiple converter units at both, the input section of the input star coupler and the output section of the output star coupler of the multiplexer. Thus, in an 8:1 multiplexer, only 8 input converter units and one output converter unit are required.

As an advantage, it is possible to increase the −1 dB passband width to channel spacing ratio from 30% to approximately 60% with a negligible loss penalty, i.e., less than 0.4 dB compared to the AWG cited above. The method is applicable to optical network apparatuses as both, multiplexers and demultiplexers, and for M×N coupler connecting M input lines to N output lines.

In a prior art AWG the field of a transmitter waveguide is imaged by the waveguide array onto the output side of the second star coupler. With changing wavelength, the position of the image shifts along the star coupler output, from one output waveguide to the next, etc.

The control of said beating pattern advantageously comprises the steps of generating said intensity field profile at the transmitter and receiver waveguides such that for a wavelength range around the AWG channel wavelengths the spatial shift in the position of the peak of the dynamic field profile counterbalances the wavelength dependent shift of the image of the field of the transmitter waveguide. This assures that the coupling from transmitter to receiver waveguide stays high over this wavelength range resulting in a flattened passband. Due to the periodicity of the dynamic field profile, the counterbalancing effect, and thus the passband -flattening, can be made to re-occur for all channel wavelengths.

Advantageously, said step of generating a dynamic field profile is achieved by a superposition of a fundamental mode and a higher order mode, as e.g., TE0 mode and a TE1 mode, in a bimodal transmitter waveguide in the input section of an AWG according to the present invention, and said periodic movement is generated by imposing a wavelength dependent phase shift of an integer multiple of 2 B for each wavelength change of the size of the channel spacing.

According to a second, preferred embodiment, a further aspect of the present invention is disclosed. According to said second aspect said step of converting monomode light, of each of said input waveguides of said AWG-comprising apparatus, into a respective superposition of multiple modes comprises the step of making a power ratio between said fundamental mode and said higher order mode specific for each input wavelength. Here, a lower number of converter units is required. In a 8:1 multiplexer, for example, there is needed just one converter unit at its output. A 1:8 demultiplexer can be obtained by solely reversing the AWG apparatus. For purposes of generalization only it should be mentioned that it would also be possible to provide the demultiplexer apparatus with 8 converter units at its output and none of them at its input. This, however would be a waste of resources.

The key advantage of these improved AWG designs lies in the fact that they provide a method to obtain a flattened passband without the introduction of 3 dB extra loss, as opposed to other broadened passband designs.

BRIEF DESCRIPTION OF THE DRAWINGS

The present invention is illustrated by way of example and is not limited by the shape of the figures of the accompanying drawings in which:

FIG. 1 is a schematic drawing of prior art AWG arrangement used as a wavelength demultiplexer, FIG. 2 is a drawing showing the transmission characteristic of the input of a prior art AWG to two different output channels.

FIG. 6 shows intensity versus position of the field profile of the input waveguide imaged by the waveguide array onto the end of the output star coupler (straight line), compared to the field profiles of two output waveguides (dashed lines), for increasing input wavelengths as depicted in FIG. 4.

DETAILED DESCRIPTION OF THE PREFERRED EMBODIMENTS

Figure 3:
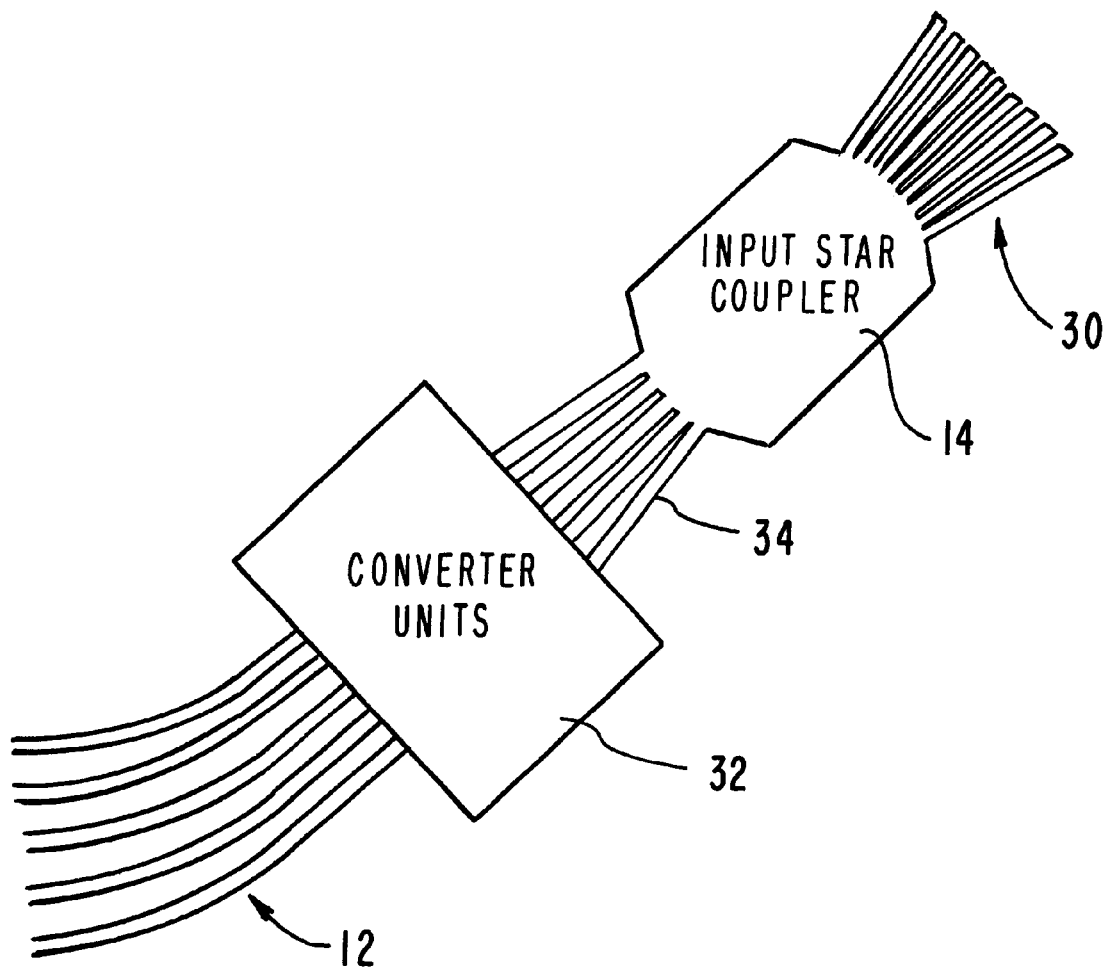
FIG. 3 is a simplified schematic drawing showing the input section of an AWG arrangement improved according to the present invention in its first aspect as mentioned above.

With general reference to the figures and with special reference now to a prior art AWG comprising demultiplexer 10 as depicted in FIG. 1 the monomode input waveguides 12 end directly in the input star coupler 14. From this star coupler an array 16 of waveguides with linearly increasing lengths leads to the output star coupler 18. The monomode output waveguides 20 depart directly from this output star coupler.

FIG. 3 shows a simplified, schematic drawing of the input section of an AWG 30 which is improved according a first aspect of the present invention in which the light from the monomode input waveguides 12 is transformed in a plurality of inventive converter units 32 -one per input waveguide- into a superposition of multiple waveguide modes. The corresponding input section is enclosed by a broken line in FIG. 1 for comparison.

These multiple waveguide modes are transferred separately to the input star coupler 14 by some multimode transmitter waveguides 34. At the output star coupler—not depicted in the drawing—this situation is mirrored: The light is first coupled into multimode receiver waveguides and then transferred to the monomode output waveguides by converter units of the same type as mentioned above.

The wavelength-dependent beating pattern of the multiple waveguide modes generates a controllable and thus somehow 'dynamic' field profile at the input of the input star coupler 14.

According to the invention it is disclosed down belowhow a suitably engineered dynamic field profile can be used to broaden the passband of the AWG arrangement improved as described above to 60% of the channel spacing.

Figure 4:
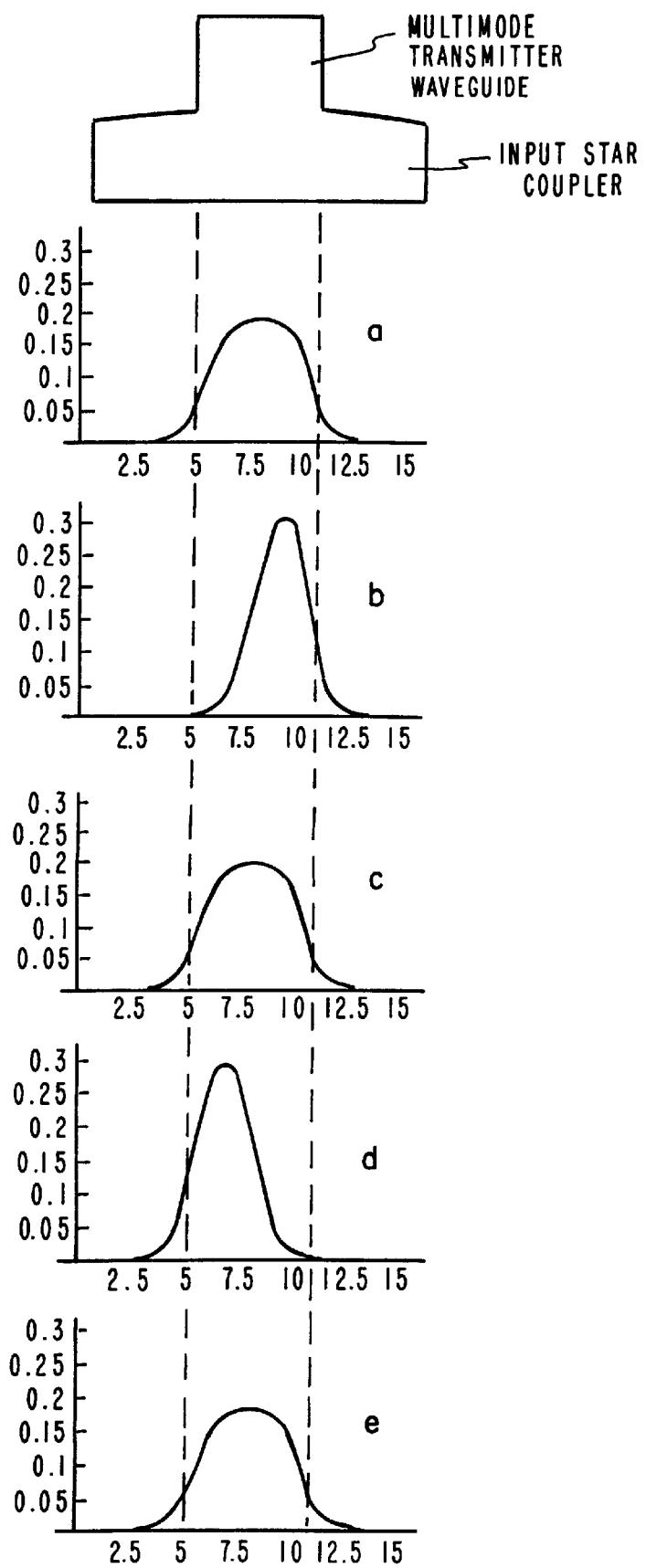
FIGS. 4a to 4e show intensity versus lateral position of the field profile at the end of a multimode transmitter waveguide, for five different wavelengths, increasing from 4a with 81, 4b with 81+)8/4

With reference to FIG. 4 the dynamic field profile at the output of the multimode transmitter waveguide 34 should be constructed in such a way that for light with a wavelength conforming to the AWG channel wavelengths, the field is centered at the waveguide centers (see FIGS. 4a and 4e). However, when the wavelength of the light is slightly longer than the first channel wavelength, the field maximum should move to the right side of the waveguide center (FIG. 4b), then return to the center for the wavelength just between the channel wavelengths (FIG. 4c), then move to the other side of the waveguide center (FIG. 4d) and finally return to the center when the wavelength of the light equals the second channel wavelength (FIG. 4e). Right sides and left sides can naturally be reversed, too.

The dynamic field profile as shown in FIG. 4 has been generated by the superposition of a TE0 and a TE1 mode with a fixed power ratio of 0.8/0.2 in a bimodal waveguide 34. The periodic movement is generated by imposing a wavelength dependent phase shift of 2B for each wavelength change of the size of a channel spacing.

Figure 5:
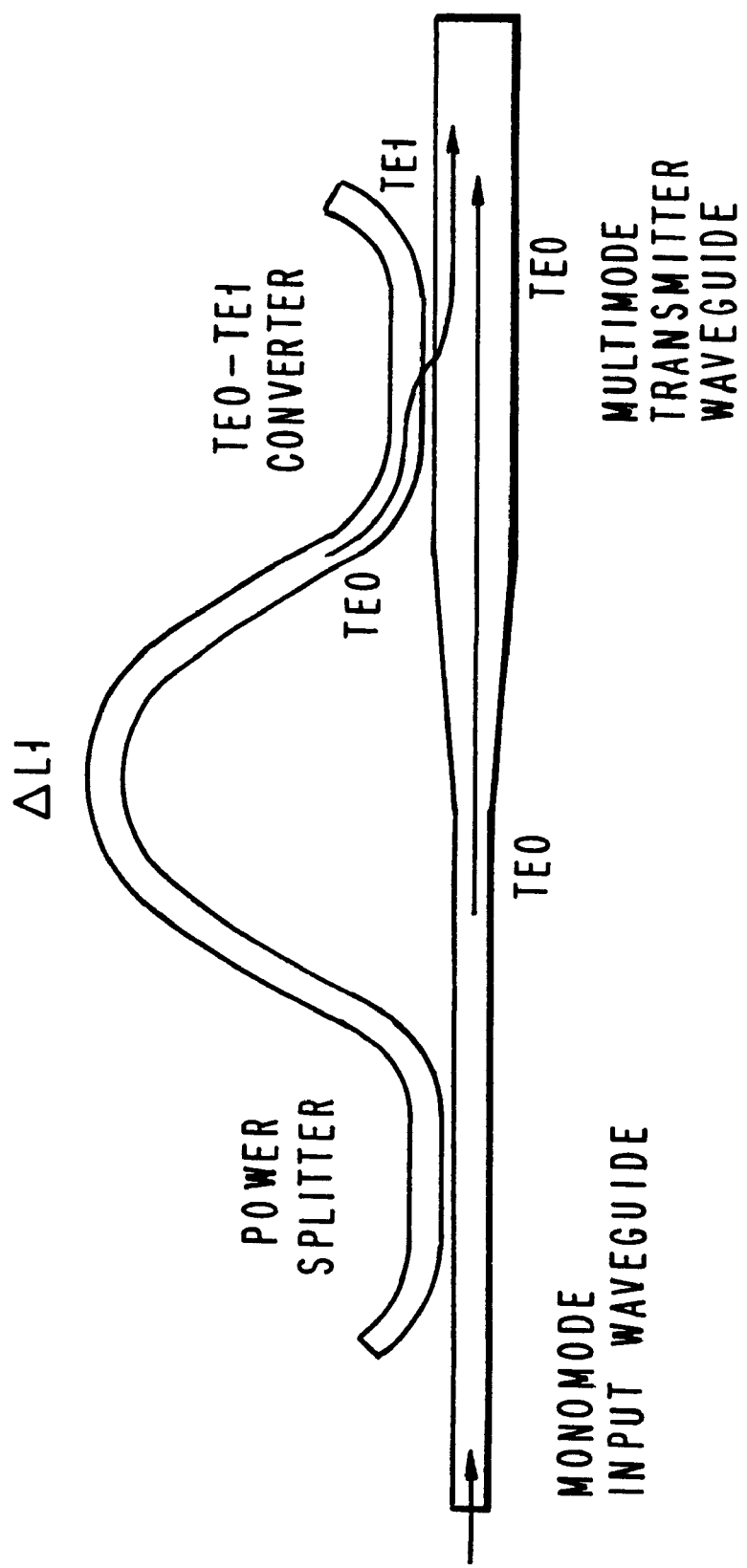
FIG. 5 is a schematic functional drawing showing the basic functions of a converter unit according to the first aspect of the present invention.

An example of a converter unit 32 which can generate this field profile is shown schematically in FIG. 5. It comprises a power splitter which splits off 20% of the power into the upper branch. The remaining 80% in the lower branch is converted to the TE0 mode of the multimode waveguide by a conventional taper. The power in the upper branch is coupled to the TE1 mode of the multimode waveguide 34 by the mode converter. The beating period (e.g. )8=1.6 nm) of the mode superposition in the multimode transmitter waveguide 34 is determined by the length difference )L1 between the upper and lower branches.

The power splitter and mode converter are prior art optical apparatuses which need not be explained in more detail as a person skilled in the art knows their structure and way of operation. Said apparatuses in this example are implemented using directional couplers. However, other implementations using e.g., Y-splitters or multimode interferometers (MMIs) are also possible.

For a better understanding of the inventive basic concepts and with reference to FIG. 6 a more detailed description is given next below on the broadening of passband phenomenon using controllable 'dynamic' field profiles.

In a prior art standard AWG, the waveguide array projects an image of the field profile of the input waveguide at the output side of the output star coupler. This image is thus formed in the plane where the output or receiver waveguides 20 begin. When the input wavelength changes, the position of the image shifts along this plane. When the input wavelength equals one of the channel wavelengths (81, 82, . . . 8n) the position of the image coincides with the corresponding output waveguide 20. This is shown in FIG. 6 for a standard AWG. In this figure, the image (straight line) of the field profile of the input waveguide 12 moves from left to right for increasing input wavelength (FIGS. 6a through 6e). The field profiles of two output waveguides 20 are also shown (dashed lines). When the input wavelength equals one of the channel wavelengths, the image of the field profile of the input waveguide 12 overlaps with the field profile of one of the output waveguides 20 (FIGS. 6a and 6e). However, for a wavelength just 25% of one channel spacing off from the channel wavelengths, the overlap is already reduced severely (FIGS. 6b and 6d).

Figure 7:
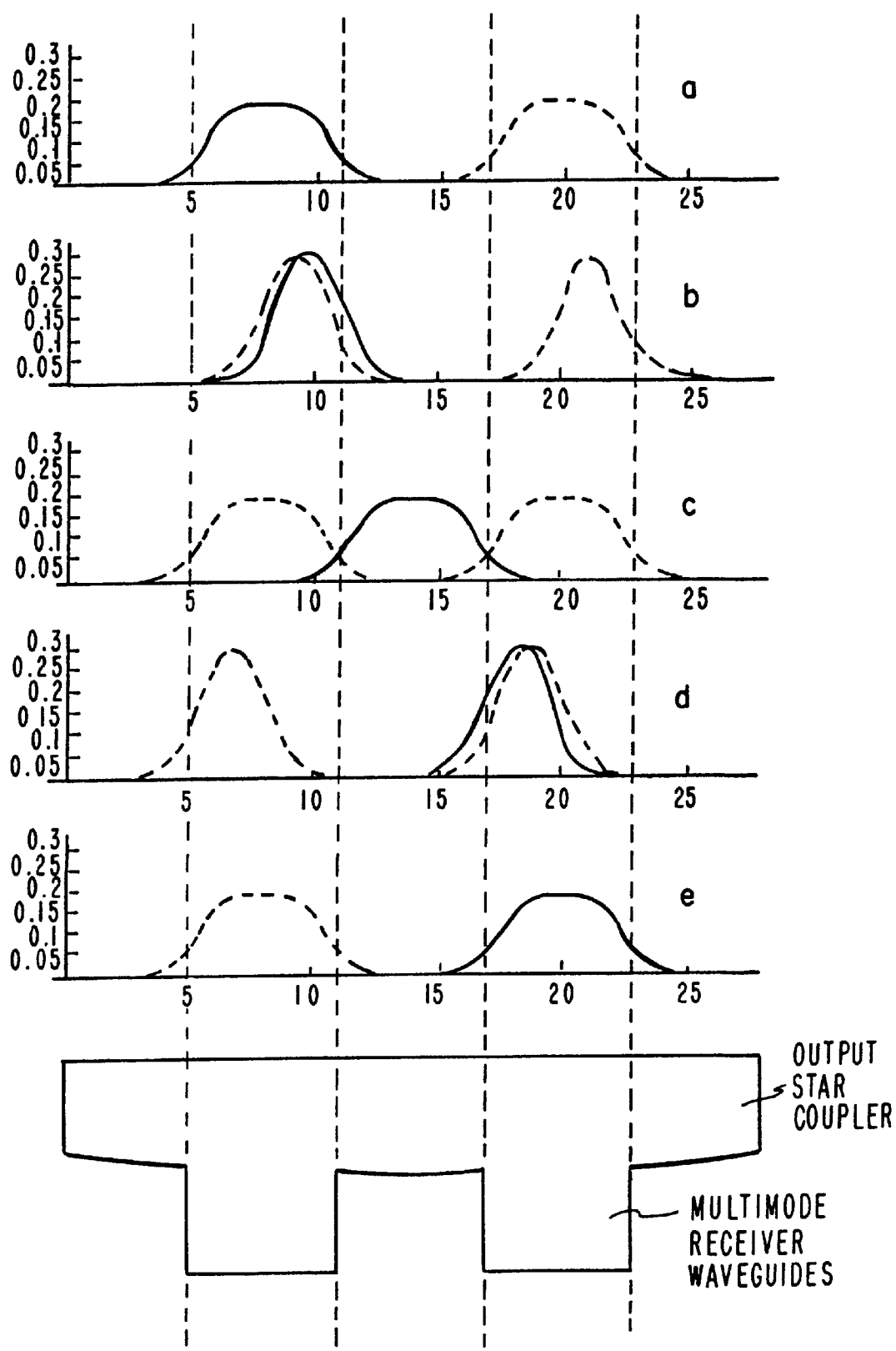
FIG. 7 shows the image of the transmitter waveguide in the output star coupler (straight line) compared to the dynamic field profiles of two receiver waveguides (dashed lines) for increasing input wavelengths as depicted in FIG. 4, FIGS. 8a, 8b are drawings showing the input to output waveguide transfer functions for a prior art (8a) and an inventive AWG arrangement (8b)

In FIG. 7, comparable curves are shown for an improved AWG, where the above described dynamic field profiles have been used. At the channel wavelengths there is again full overlap between the image of the transmitter waveguide 34 field profile and one of the receiver waveguide 20 field profiles (FIGS. 6a and 6e). However, for the receiver waveguides 20 (dashed lines), a dynamic field profile has been chosen where the field maximum moves to the right for a wavelength 25% above the channel wavelengths, whereas for the transmitter waveguide 34 (continuous line) a field profile has been chosen where the field maximum moves to the left relative to the focus position. Due to these two shifts, the overlap to the left receiver waveguide 20 is still high for an input wavelength which lies 25% of one channel spacing above the left channel wavelength (FIG. 6b). This situation is mirrored for the wavelength 25% of one channel spacing below the right channel wavelength. Here the receiver mode maximum has moved to the right and the transmitter image maximum has moved to the left (FIG. 6d), leading to an already high overlap to the right receiver channel for this wavelength.

Figure 8:
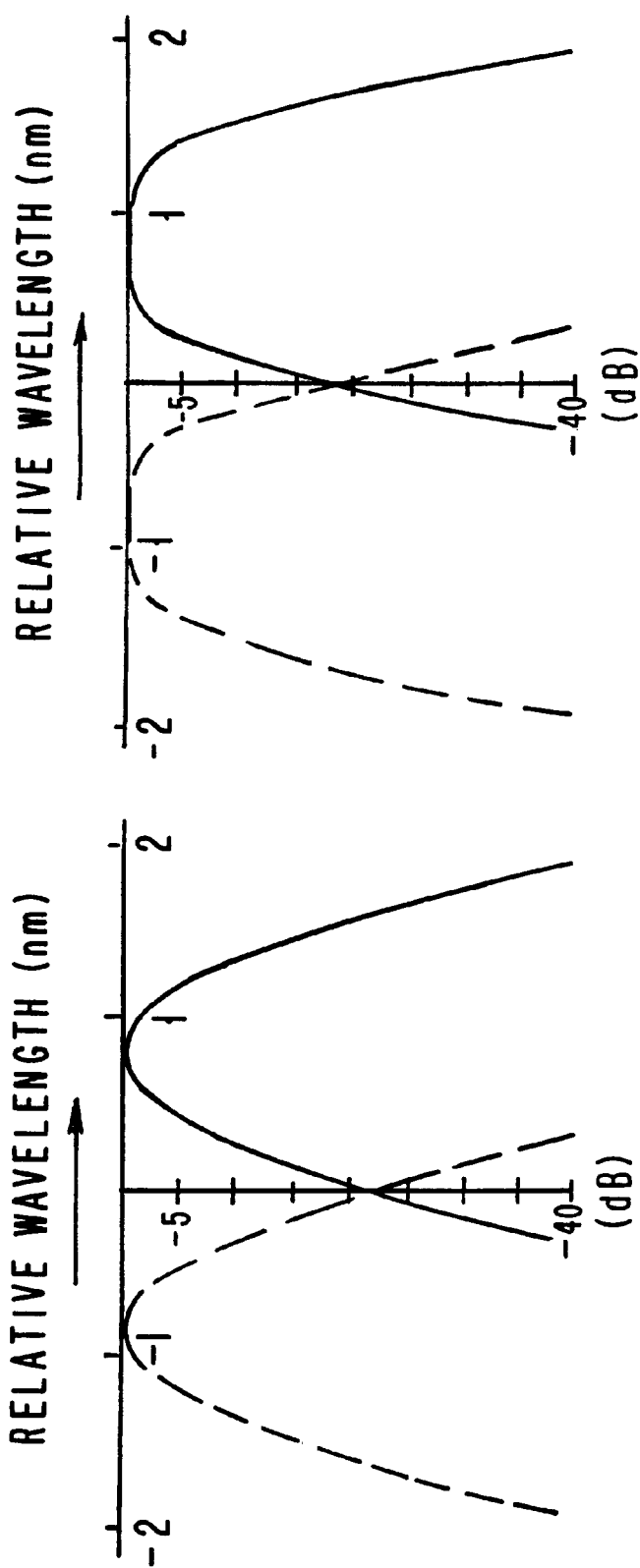

FIG. 8 shows the input to output waveguide transfer functions for a prior art (8a) and an inventive AWG arrangement (8b). From this comparison the overall result as depicted in FIG. 8 is appreciable as demonstrating a considerable broadening of the input to output waveguide transfer functions while retaining a better than −40 dB channel to channel crosstalk, as can be seen by comparing FIG. 8a (prior art AWG) to FIG. 8b (inventively broadened AWG).

Figure 9:
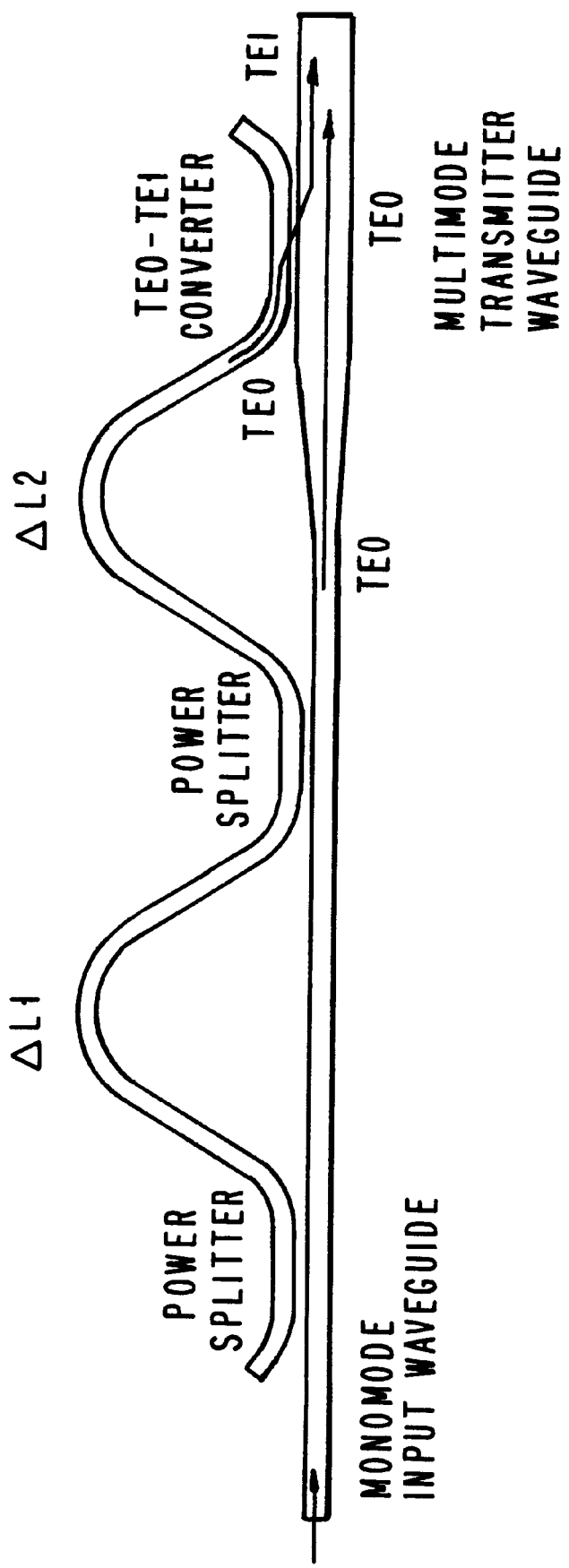
FIG. 9 is a schematic functional drawing showing the basic functions of a converter unit according to the second, preferred aspect of the present invention.
Figure 10A:
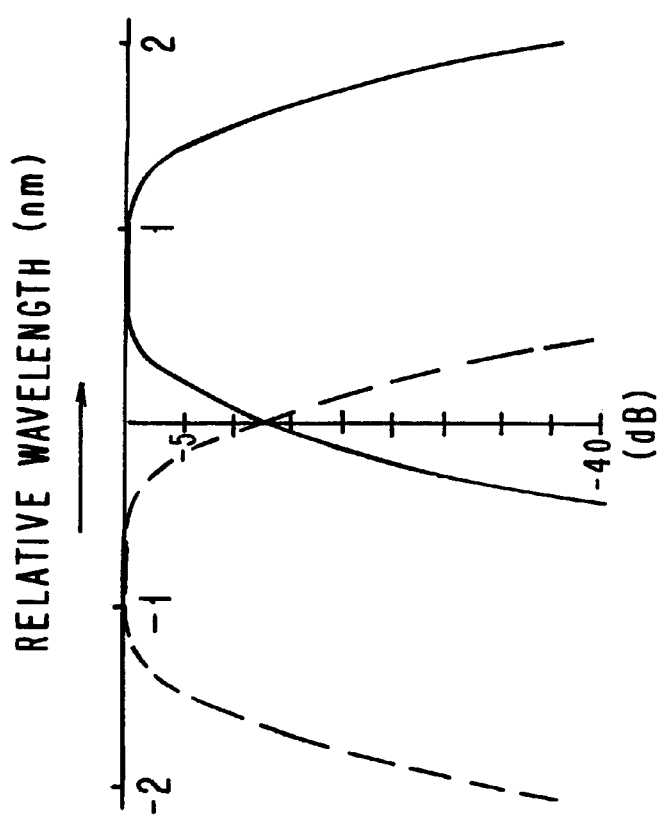
FIGS. 10a, 10b are drawings showing the input to output waveguide transfer functions for an AWG arrangement according to the first aspect of the present invention having fixed power ratio converter units (10a) for variable power ratio converter units according to the second aspect of the present invention (10b).
Figure 10B:
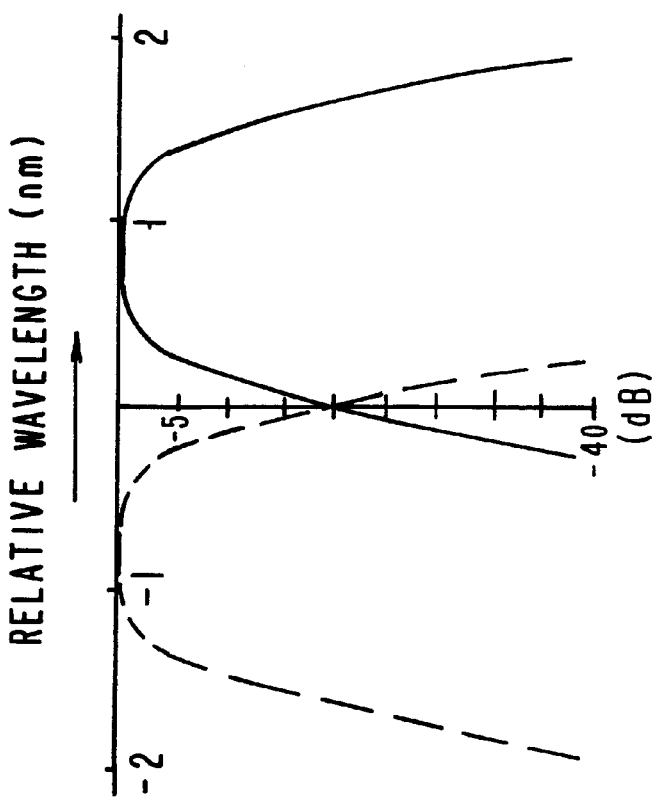

With reference to FIGS. 9 and 10 a further specially preferred embodiment of an inventive AWG arrangement is described.

In the previously described broadened AWG design, converter units 32 were used at both the input and the output side of the AWG. This means that e.g. for an 1 to 8 AWG demultiplexer a total of 9 converter units are needed, e.g., 1 at the input, 8 at the outputs.

By using a more sophisticated inventive converter unit 32 design it is possible to achieve comparable results, i.e., about 0.5 dB loss, passband −1 dB with 55% of channel spacing, with a converter unit 32 at only one side. For the 1 to 8 AWG demultiplexer only 1 unit, at the input, is required.

An example of a converter unit 32 that could be used in this case is shown in FIG. 9. This converter unit again generates a superposition of a TE0 and a TE1 mode. However, in this case the power ratio between the two modes is made wavelength-dependent using a Mach Zehnder filter, consisting of the two power splitters linked by two waveguides with a length difference )L1.

The splitting constants of the power splitters and the length difference )L1 are chosen in such a way that the power ratio TE0/TE1 is 0.25/0.75 for a wavelength halfway between two channel wavelengths, and the TE1 mode portion is 0% while the TE0 mode portion is 100% for the channel wavelengths.

The light from the lower output branch of the filter is coupled adiabatically to the TE0 mode of the multimode waveguide by a taper. The light from the upper branch is coupled to the TE1 mode of the multimode waveguide by a mode converter The proper beating period between the two modes in the multimode transmitter waveguide 34 is determined by )L2.

In this embodiment directional couplers are used to implement the power splitters and mode converter. However, other implementations using e.g. y-splitters or MMIs are also possible.

With reference to FIG. 10 the results of this second aspect of providing variable power ratios are described as follows. In FIG. 10 the transfer functions of the two improved AWG designs are compared. The −1 dB passband width for both designs is comparable. However, the design using a variable power ratio has a slightly higher loss of about 0.5 dB and a slightly larger passband ripple of about 0.2 dB. Also the edges of the passband are less steep. These disadvantages are counterbalanced by the savings in space because only one variable power ratio converter unit 32 needs to be used in this example of a demultiplexer.

As should be noted supplementally, the disadvantage of these improved AWG designs described above lie in the extra space required by the converter unit(s) and in the fact that the wavelength dependency of the converter unit(s) 32 must match the wavelength dependency of the main AWG.

However, especially using the variable power ratio converter unit 32, the space required by the converter unit 32 will be small compared to the AWG itself. In the IBM SiON technology, for example, the wavelength matching can be realized conveniently using so-called heater tuning, as it has been demonstrated already in prior art IBM add-drop multiplexers in which the temperature dependence of the refraction index n(T) is used.

It should be noted that due to the ability of optical apparatuses to have a reciprocal, i.e., reversed functionality when they are arranged in a mirrored orientation, the inventive method and apparatus as described with reference to FIGS. 3 to 10 can be reversed such that they can be used in a mirrored arrangement for transforming multimode light into monomode light. This can be applied for providing e.g. a 8:1 multiplexer having one inventive converter unit at its output side.

In the foregoing specification the invention has been described with reference to a specific exemplary embodiment thereof It will, however, be evident that various modifications and changes may be made thereto without departing from the broader spirit and scope of the invention as set forth in the appended claims. The specification and drawings are accordingly to be regarded as illustrative rather than in a restrictive sense.

The present invention reflects a general principle of AWG design. It can be realized basically in all common materials being adequate in waveguide fabricating technology as e.g., 3–5-semiconductor technology, SiO2 and others. It is thus not limited to SiON technology.

What is claim is:

1. Method for improving the passband of an optical network apparatus comprising an arrayed waveguide grating having input from at least one monoguide input waveguide associated with a plurality of multimode transmitter waveguides and providing output, wherein at least one monomode receiver waveguide is associated with the output, said method comprising the steps of:
    generating, using input light from the at least one monomode input waveguide, an intensity field profile with a controllable beating pattern in a multimode superposition transmitted in the multimode transmitter waveguides; and
    controlling said beating pattern spatially for increasing mode overlap in the at least one monomode receiver waveguide associated with an output of said apparatus.

2. The method according to claim 1 in which the step of controlling said beating pattern comprises the step of generating said intensity field profile at said transmitter and receiver waveguides such that for at least one predetermined wavelength range around a respective arrayed waveguide grating channel wavelength a spatial shift in the position of the peak of said intensity field profile helps to counterbalance a wavelength-dependent shift of the image of said intensity field profile of each transmitter waveguide.

3. The method according to claim 2, in which said step of generating an intensity field profile is achieved by a controlled superposition of multiple modes in said multimode transmitter waveguides (34), and said spatial shift in the position of said peak is effected by generating a wavelength-dependent phase shift between said multiple modes, which changes with an integer multiple of $2\pi$ for a wavelength change of the size of a channel spacing.

4. The method according to claim 1, in which said step of generating an intensity field profile comprises the step of making a power ratio between multiple modes of said multimode superposition dependent on wavelength of said input light in a spatially periodical way, with a periodicity equal to the size of channel spacing for respective grating channels of said waveguides.

5. The method according to claim 1 whereby said method is used to control said multimode superposition for transforming said light into monomode light.

6. The method according to claim 2 whereby said method is used to control said multimode superposition for transforming said light into monomode light.

7. The method according to claim 3 whereby said method is used to control said multimode superposition for transforming said light into monomode light.

8. The method according to claim 4 whereby said method is used to control said multimode superposition for transforming said light into monomode light.

9. An optical apparatus usable to route optical wavelengths, comprising an arrayed waveguide grating arrangement comprising an arrayed waveguide grating having input from at least one monoguide input waveguide associated with a plurality of multimode transmitter waveguides and providing output, wherein at least one monomode receiver waveguide is associated with the output, which comprises:
    generator means for generating, using light from at least one monomode input waveguide, an intensity field profile with a peak and a controllable beating pattern in a multimode superposition transmitted in a respective number of multimode transmitter waveguides, and
    controller means for controlling said beating pattern spatially for increasing mode overlap in at least one monomode receiver waveguide associated with an output of said apparatus.

10. The apparatus according to claim 9 in which said controller means comprises:
    profile means for generating said intensity field profile at least one of said transmitter and receiver waveguides such that for at least one of a predetermined wavelength range around a respective arrayed waveguide grating channel wavelength, a spatial shift in the position of the peak of said intensity field profile helps to counterbalance a wavelength-dependent shift of the image of said intensity field profile of the respective transmitter waveguide.

11. The apparatus according to claim 10 in which said profile means comprises means for generating a controlled superposition of multiple modes in a multi-modal waveguide, and means for generating said spatial shift in the position of said peak for effecting a wavelength dependent phase shift between said multiple modes, which changes with an integer multiple of $2\pi$ for a wavelength change of the size of a channel spacing.

12. The apparatus according to claim 11 in which said means for generating said controlled superposition of multiple modes in said multi-modal waveguide comprises means for making a power ratio between said modes of said multimode superposition dependent of the wavelength in a spatially periodical way, with a periodicity equal to the size of said channel spacing.

13. The apparatus according to claim 9 further comprising means for controlling said multimode superposition light for transforming it into monomode light.

14. The apparatus according to claim 10 further comprising means for controlling said multimode superposition light for transforming it into monomode light.

15. The apparatus according to claim 11 further comprising means for controlling said multimode superposition light for transforming it into monomode light.

16. The apparatus according to claim 12 further comprising means for controlling said multimode superposition light for transforming it into monomode light.

17. A multiplexer usable in optical networks to route optical wavelengths, comprising an arrayed waveguide grating arrangement comprising an arrayed waveguide grating having input from at least one monoguide input waveguide associated with a plurality of transmitter waveguides and providing output, wherein at least one monomode receiver waveguide is associated with the output, which comprises:
    generator means for generating, using light from at least one monomode input waveguide, an intensity field profile with a controllable beating pattern in a multimode superposition transmitted in a respective number of multimode transmitter waveguides, and
    controller means for controlling said beating pattern spatially for increasing mode overlap in at least one monomode receiver waveguide associated with an output of said apparatus.

18. A demultiplexer usable in optical networks to usable to route optical wavelengths, comprising an arrayed waveguide grating arrangement comprising an arrayed waveguide grating having input from at least one monoguide input waveguide associated with a plurality of transmitter waveguides and providing output, wherein at least one monomode receiver waveguide is associated with the output, which comprises:
    generator means for generating, using light from at least one monomode input waveguide, an intensity field profile with a controllable beating pattern in a multimode superposition transmitted in a respective number of multimode transmitter waveguides, and controller means for controlling said beating pattern spatially for increasing mode overlap in at least one monomode receiver waveguide associated with an output of said apparatus.

19. A M×N coupler connecting M input lines to N output lines and usable in optical networks to usable to route optical wavelengths, comprising an arrayed waveguide grating arrangement comprising an arrayed waveguide grating having input from at least one monoguide input waveguide associated with a plurality of transmitter waveguides and providing output, wherein at least one monomode receiver waveguide is associated with the output, which comprises:

generator means for generating, using light from at least one monomode input waveguide, an intensity field profile with a controllable beating pattern in a multimode superposition transmitted in a respective number of multimode transmitter waveguides, and controller means for controlling said beating pattern spatially for increasing mode overlap in at least one monomode receiver waveguide associated with an output of said apparatus.

20. A program storage device readable by machine, tangibly embodying a program of instructions executable by the machine to perform method steps for improving the passband of an optical network apparatus comprising an arrayed waveguide grating having input from at least one monoguide input waveguide associated with a plurality of transmitter waveguides and providing output, wherein at least one monomode receiver waveguide is associated with the output, said method comprising the steps of:

generating, using light from the at least one monomode input waveguide, an intensity field profile with a controllable beating pattern in a multimode superposition transmitted in the multimode transmitter waveguides; and controlling said beating pattern spatially for increasing mode overlap in the at least one monomode receiver waveguide associated with an output of said apparatus.

* * * * *